(12) United States Patent
Kim

(10) Patent No.: US 8,331,332 B2
(45) Date of Patent: Dec. 11, 2012

(54) WIRELESS USB HOST AND CHANNEL TIME ALLOCATION METHOD

(75) Inventor: Ji Tae Kim, Yogin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 411 days.

(21) Appl. No.: 12/635,777

(22) Filed: Dec. 11, 2009

(65) Prior Publication Data

US 2010/0150115 A1 Jun. 17, 2010

(30) Foreign Application Priority Data

Dec. 11, 2008 (KR) .................. 10-2008-0125706

(51) Int. Cl.
*H04W 72/04* (2009.01)
(52) U.S. Cl. .................. 370/336; 370/338; 370/329
(58) Field of Classification Search .................. 370/336, 370/350; 709/223
See application file for complete search history.

(56) References Cited

U.S. PATENT DOCUMENTS

2007/0061436 A1* 3/2007 Bae et al. .................. 709/223

FOREIGN PATENT DOCUMENTS

| JP | 2007-306057 | 11/2007 |
|---|---|---|
| KR | 1020060086716 A | 8/2006 |
| KR | 100664941 B1 | 12/2006 |
| KR | 1020070018270 A | 2/2007 |

OTHER PUBLICATIONS

English translation of JP 2009-278507, Satoh.*

* cited by examiner

*Primary Examiner* — Dang Ton
*Assistant Examiner* — Pamit Kaur
(74) *Attorney, Agent, or Firm* — Volentine & Whitt, PLLC

(57) ABSTRACT

A wireless universal serial bus (WUSB) host is configured to execute WUSB communication with at least one WUSB device. The WUSB host includes a transmitter, a receiver, an analyzer, an adaptive channel time allocation (CTA) setting unit, and a controller. The transmitter is configured to broadcast an initial control packet to the at least one WUSB device, where the control packet includes CTA information generated for the at least one WUSB device. The receiver is configured to receive a data packet from the at least one WUSB device in a packet receiving period indicated by the CTA information included in the control packet. The analyzer is configured to analyze at least one data packet received by the receiver and to determine whether the data packet has been normally received. The adaptive CTA setting unit is configured to adaptively determine, for each of the at least one WUSB device, an optimal packet receiving period in which the analyzer has determined that the data packet has been normally received, and to set the CTA information generated for the at least one WUSB device based on the optimal packet receiving period. The controller configured to generate a subsequent control packet including the CTA information set by the adaptive CTA setting unit.

10 Claims, 12 Drawing Sheets

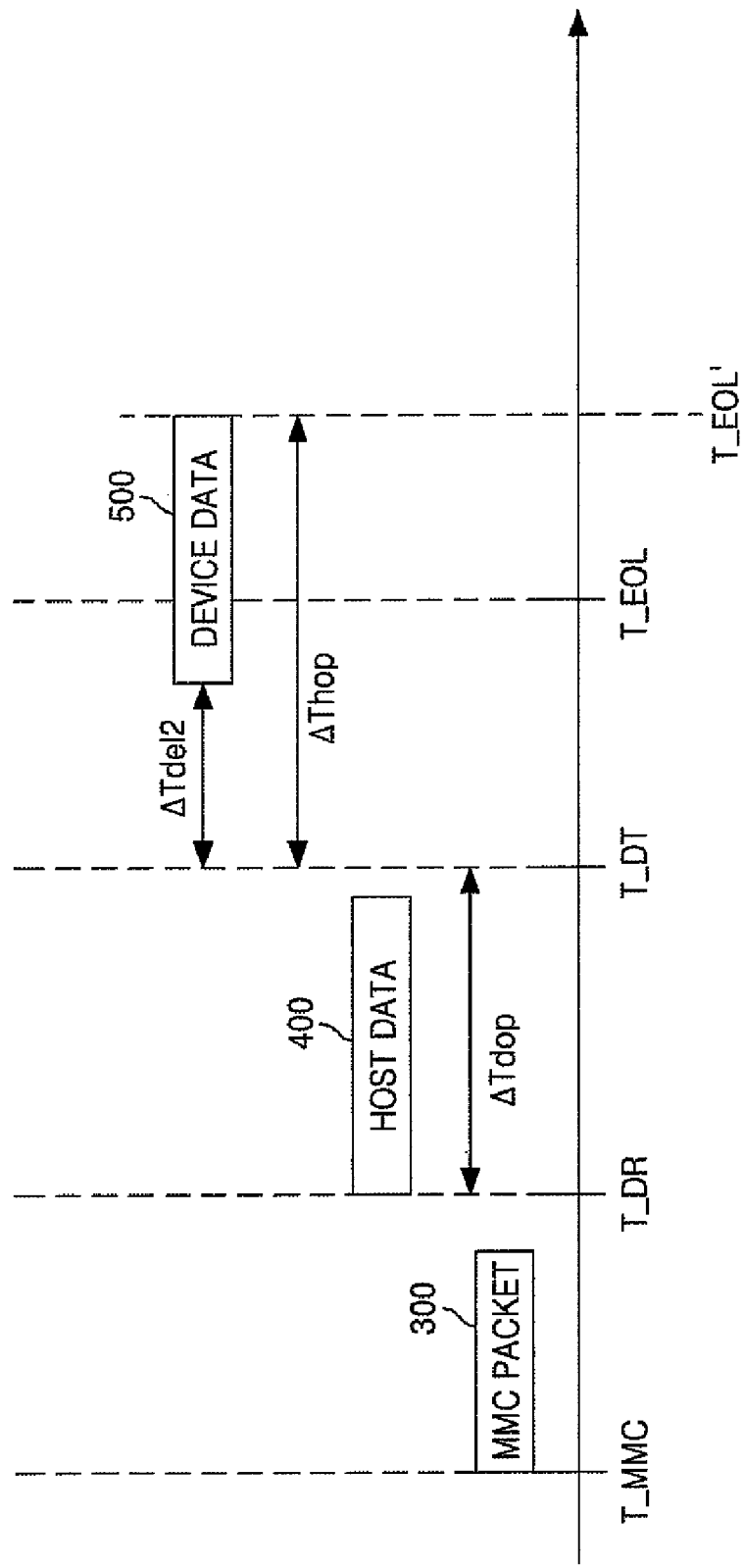

WIRELESS USB HOST AND CHANNEL TIME ALLOCATION METHOD

CROSS-REFERENCE TO RELATED APPLICATIONS

A claim of priority under 35 U.S.C. §119 is made to Korean Patent Application No. 10-2008-0125706, filed Dec. 11, 2008, in the Korean Intellectual Property Office, the disclosure of which is incorporated herein by reference.

BACKGROUND

The inventive concepts described herein generally relate to a wireless universal serial bus (WUSB) host, and more particularly, to techniques and device configurations for channel time allocation of a WUSB host.

A universal serial bus (USB) is a standardized serial port which allows for plug-and-play interface between a computer and a multitude of different types of peripheral devices, such as audio players, joysticks, keyboards, telephones, scanners, printers, monitors, mice, modems, and so on.

With the effort to eliminate USB cables connecting a computer system with external peripheral devices, WUSB based on ultra-wideband (UWB) technology has been standardized. WUSB aims at a communication speed (e.g., 480 Mbps) comparable to the data rate of standard wired USB 2.0 at distances up to 10 meters.

A WUSB system includes a WUSB host which generates and manages a WUSB channel and a plurality of WUSB devices which are connected to the WUSB host. For efficient data communication with the WUSB devices, the WUSB host sends and receives the data in the form of data packets at predefined transmission/reception time windows. This is generally accomplished by the WUSB host embedding channel time allocation (CTA) information in a micro-scheduled management command (MMC) packet transmitted to the WUSB devices.

SUMMARY

Exemplary embodiments of the inventive concepts provide a wireless universal serial bus (WUSB) host and channel time allocation method for minimizing reallocation of channel time and transmission of reallocated channel time information which occur when a WUSB device fails in transmission of a packet.

According to an exemplary embodiment of the inventive concepts, a wireless universal serial bus (WUSB) host is provided which is configured to execute WUSB communication with at least one WUSB device. The WUSB host includes a transmitter, a receiver, an analyzer, an adaptive channel time allocation (CTA) setting unit, and a controller. The transmitter is configured to broadcast an initial control packet to the at least one WUSB device, where the control packet includes CTA information generated for the at least one WUSB device. The receiver is configured to receive a data packet from the at least one WUSB device in a packet receiving period indicated by the CTA information included in the control packet. The analyzer is configured to analyze at least one data packet received by the receiver and to determine whether the data packet has been normally received. The adaptive CTA setting unit is configured to adaptively determine, for each of the at least one WUSB device, an optimal packet receiving period in which the analyzer has determined that the data packet has been normally received, and to set the CTA information generated for the at least one WUSB device based on the optimal packet receiving period. The controller configured to generate a subsequent control packet including the CTA information set by the adaptive CTA setting unit.

According to other exemplary embodiment of the inventive concepts, a channel time allocation (CTA) method of a wireless universal serial bus (WUSB) host is provided. The CTA method includes a first transmitting operation of broadcasting CTA information including an initial packet receiving period together with an identification of a first WUSB device, a first receiver opening operation of opening a receiver during the initial packet receiving period to receive a data packet from the first WUSB device, and an operation of extending the initial packet receiving period by a predetermined extension period when a data packet has not been normally received from the first WUSB device in the initial packet receiving period. The CTA method further includes a second transmitting operation of broadcasting CTA information including an extended packet receiving period together with the identification of the first WUSB device, a second receiver opening operation of opening the receiver in the extended packet receiving period to receive a data packet from the first WUSB device, and an operation of resetting the initial packet receiving period for the first WUSB device based on the extended packet receiving period when a data packet has been normally received from the first WUSB device in the extended packet receiving period.

BRIEF DESCRIPTION OF THE DRAWINGS

The above and other aspects and features of the inventive concepts will become readily apparent from the detailed description that follows, with reference to the accompanying drawings, in which:

FIGS. 11 and 12 are timing charts for explaining an example of communication of a data packet between the WUSB host and a WUSB device using the method illustrated in FIG. 10.

DETAILED DESCRIPTION OF THE EMBODIMENTS

The inventive concepts now will be described more fully hereinafter with reference to the accompanying drawings, in which embodiments of the inventive concepts are shown. This inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
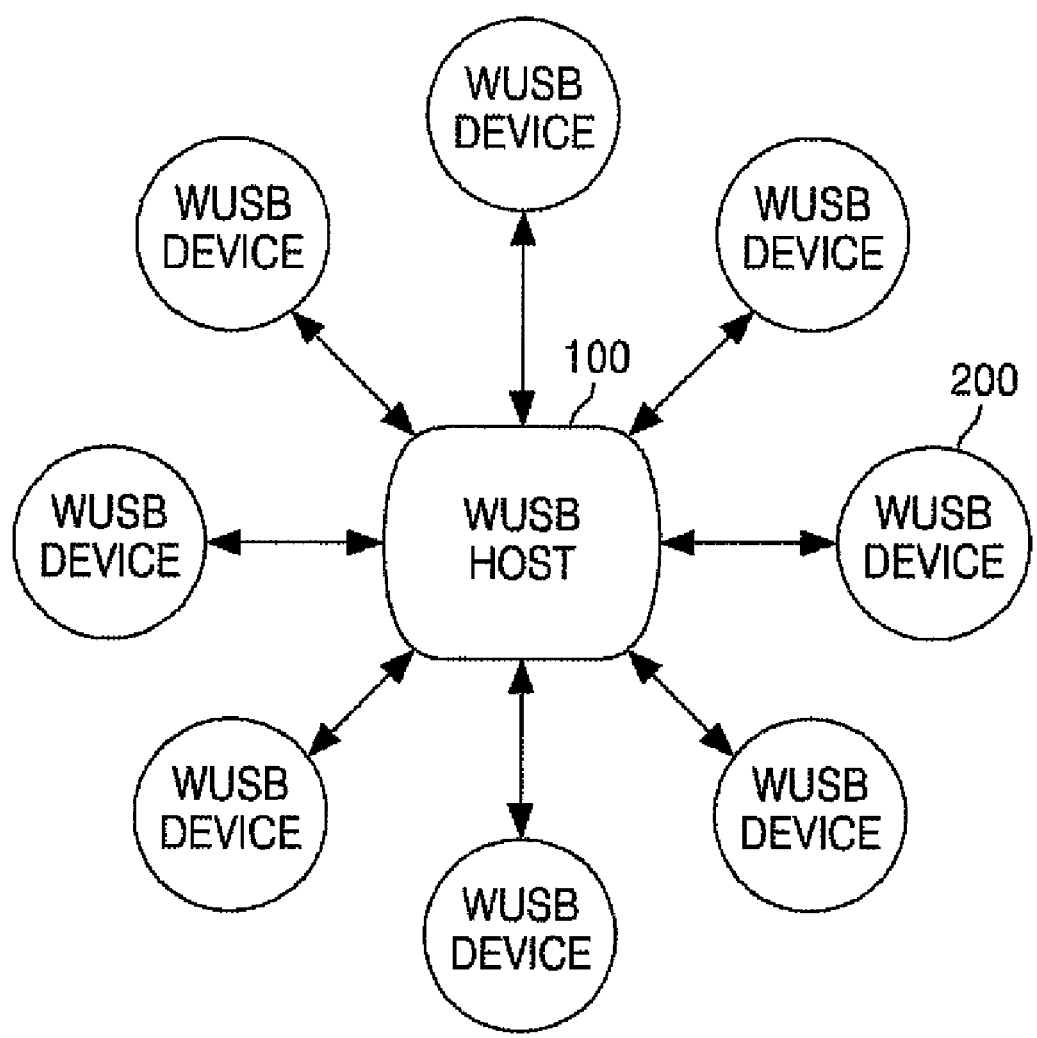
FIG. 1 is a schematic diagram of a wireless universal serial bus (WUSB) system including a WUSB host according to an exemplary embodiment of the inventive concepts.

FIG. 1 is a schematic diagram of a wireless universal serial bus (WUSB) system including a WUSB host 100 according to an exemplary embodiment of the inventive concepts. As shown, the WUSB system includes the WUSB host 100 and one or more WUSB devices 200.

The WUSB host 100 generates and manages a WUSB channel. A personal computer (PC) is an example of the WUSB host 100. For the generation and management of the WUSB channel, the WUSB host 100 periodically broadcasts a microscheduled management command (MMC) packet to the WUSB devices 200. The MMC packet includes channel time allocation (CTA) information about a channel use time allocated to each WUSB device 200.

Figure 2:
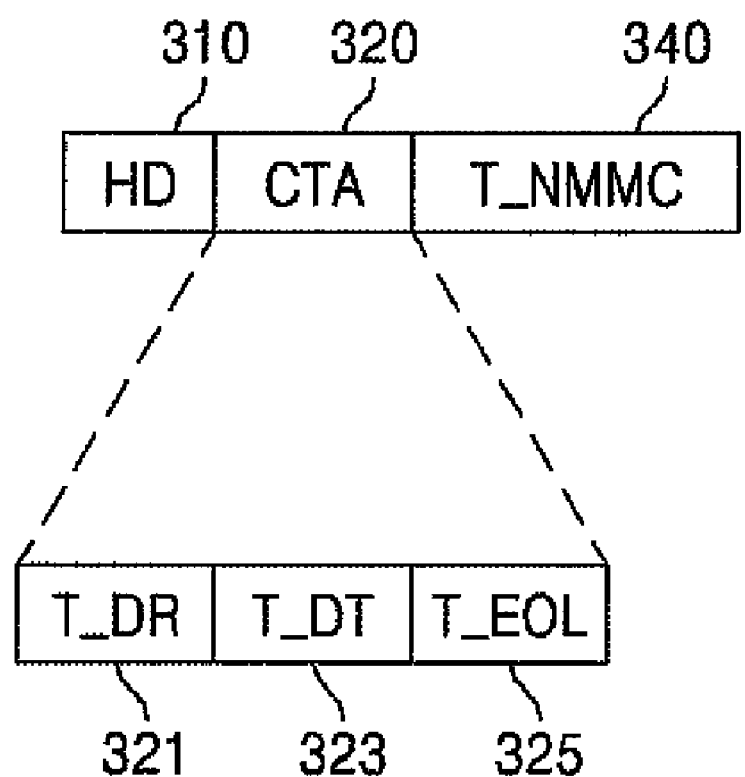
FIG. 2 is a diagram illustrating a data format of a microscheduled management command (MMC) packet sent by a WUSB host according to an exemplary embodiment of the inventive concepts.

FIG. 2 is a diagram showing an example of the data format of an MMC packet 300 sent by the WUSB host 100 according to an exemplary embodiment of the inventive concepts.

Referring to FIG. 2, the MMC packet 300 is sent at a predetermined MMC packet transmission time (T_MMC in FIG. 3, described later) and includes header HD 310, CTA information 320, and a next MMC packet transmission time T_NMMC 340.

The CTA information 320 includes time information T_DR 321 at which the WUSB host starts sending a data packet to a particular WUSB device, time information T_DT 323 at which the WUSB host starts receiving a data packet from the particular WUSB device, and time information T_EOL 325 at which the reception of the data packet ends.

Since the MMC packet 300 is broadcast to all WUSB devices connected to a communication channel controlled by the WUSB host, information (e.g., a WUSB device identification) for allowing each WUSB device to recognize the MMC packet 300 that is sent targeting the WUSB device may also be included in the MMC packet 300.

Referring back to FIG. 1, the WUSB devices 200 are connected to the WUSB host 100 for data communication with the WUSB host 100. The WUSB devices 200 may any of a variety of peripheral devices, such as keyboards, mice, digital cameras, and so on. Upon receiving the MMC packet 300 illustrated in FIG. 2, each WUSB device 200 checks the channel times, i.e., T_DR, T_DT, and T_EOL allocated to it based on the CTA information 320 included in the MMC packet 300. Thereafter, the WUSB device 200 starts receiving a data packet from the WUSB host 100 at the time T_DR, then connects to the WUSB host 100 at the time T_DT, and transmits a data packet to the WUSB host 100 until the time T_EOL.

Figure 3:
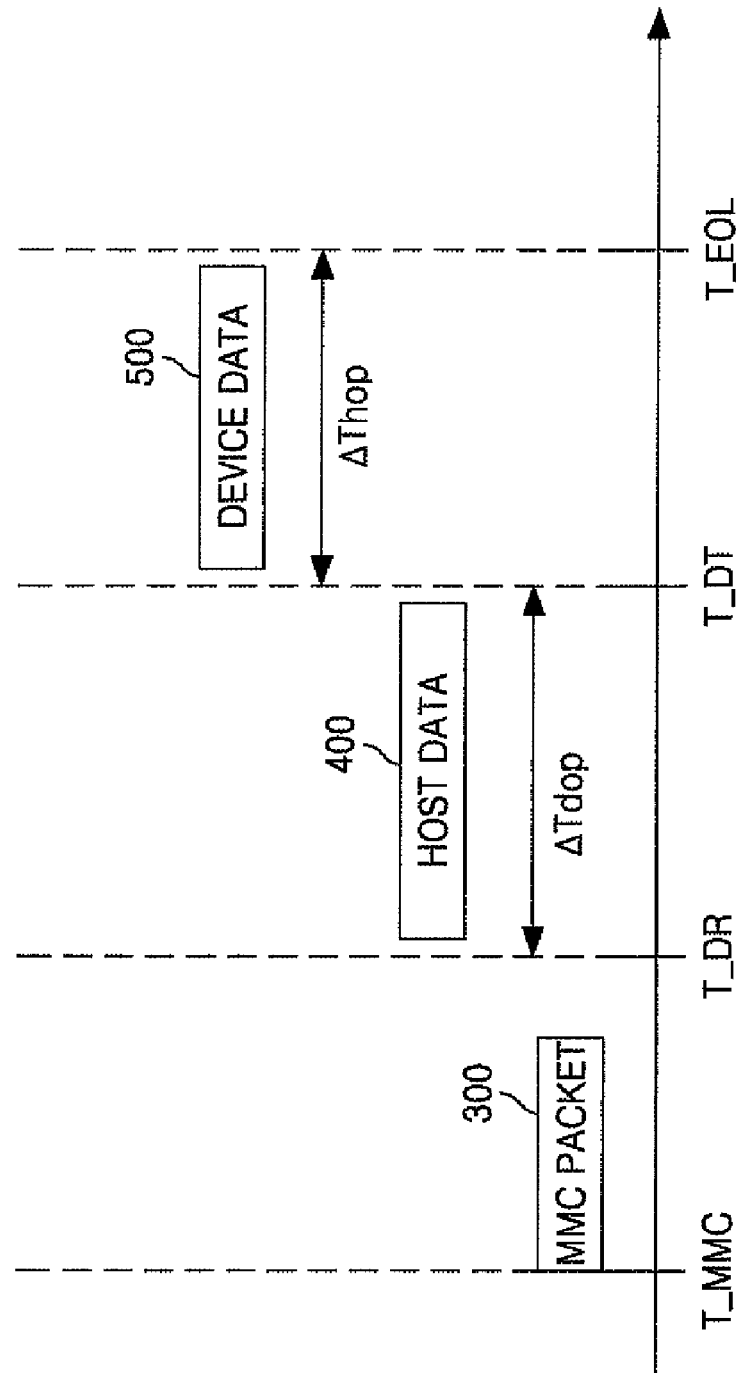
FIG. 3 is a timing chart for describing an example of normal communication of a data packet between a WUSB host and a WUSB device based on channel time allocation (CTA) information included in the MMC packet illustrated in FIG. 2.

FIG. 3 is a timing chart for explaining an example of normal communication of a data packet between a WUSB host and a WUSB device based on the CTA information 320 included in the MMC packet 300 illustrated in FIG. 2.

Referring to FIG. 3, the WUSB host transmits the MMC packet 300 at the time T_MMC, and then transmits a data packet, i.e., host data 400 to the WUSB device designated in the MMC packet 300 at the time T_DR. The WUSB host opens a receiver at the time T_DT and receives a data packet, i.e., device data 500 from the designated WUSB device until the time T_EOL. Here, the phrase "WUSB host opens a receiver" means that the WUSB host makes or continues to make the receiver status capable of receiving data or enables or continues to enable the receiver to receive data. Hereinafter, a time period ΔTdop from the time T_DR to the time T_DT during which the WUSB host transmits a data packet is referred to as a "packet transmitting period", and a time period ΔThop from the time T_DT to the time T_EOL during which the WUSB host receives a data packet is referred to as a "packet receiving period".

FIG. 3 shows a case where the device data 500 is received normally in the "packet receiving period". In a real-world communication environment, however, the device data 500 may not be successfully transmitted to the WUSB host in the "packet receiving period". For instance, due to the operating characteristics or environment of the WUSB device or a poor communication state, the device data 500 may not be successfully transmitted to the WUSB host in the "packet receiving period".

Figure 4:
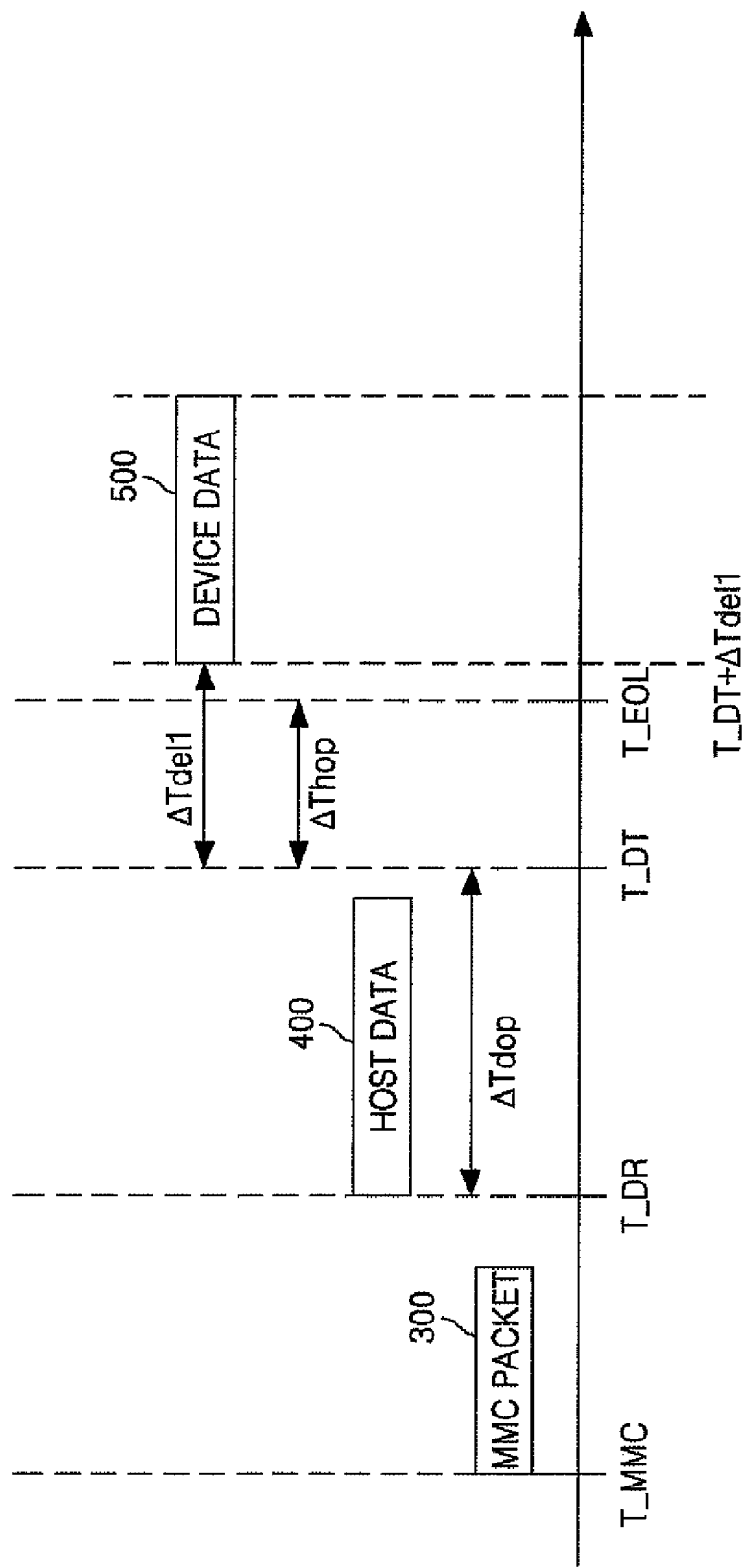
FIGS. 4 and 5 are timing charts for describing non-normal receipt by a WUSB host of a data packet from a WUSB device during a packet receiving period indicated by information on CTA performed by the WUSB host.
Figure 5:
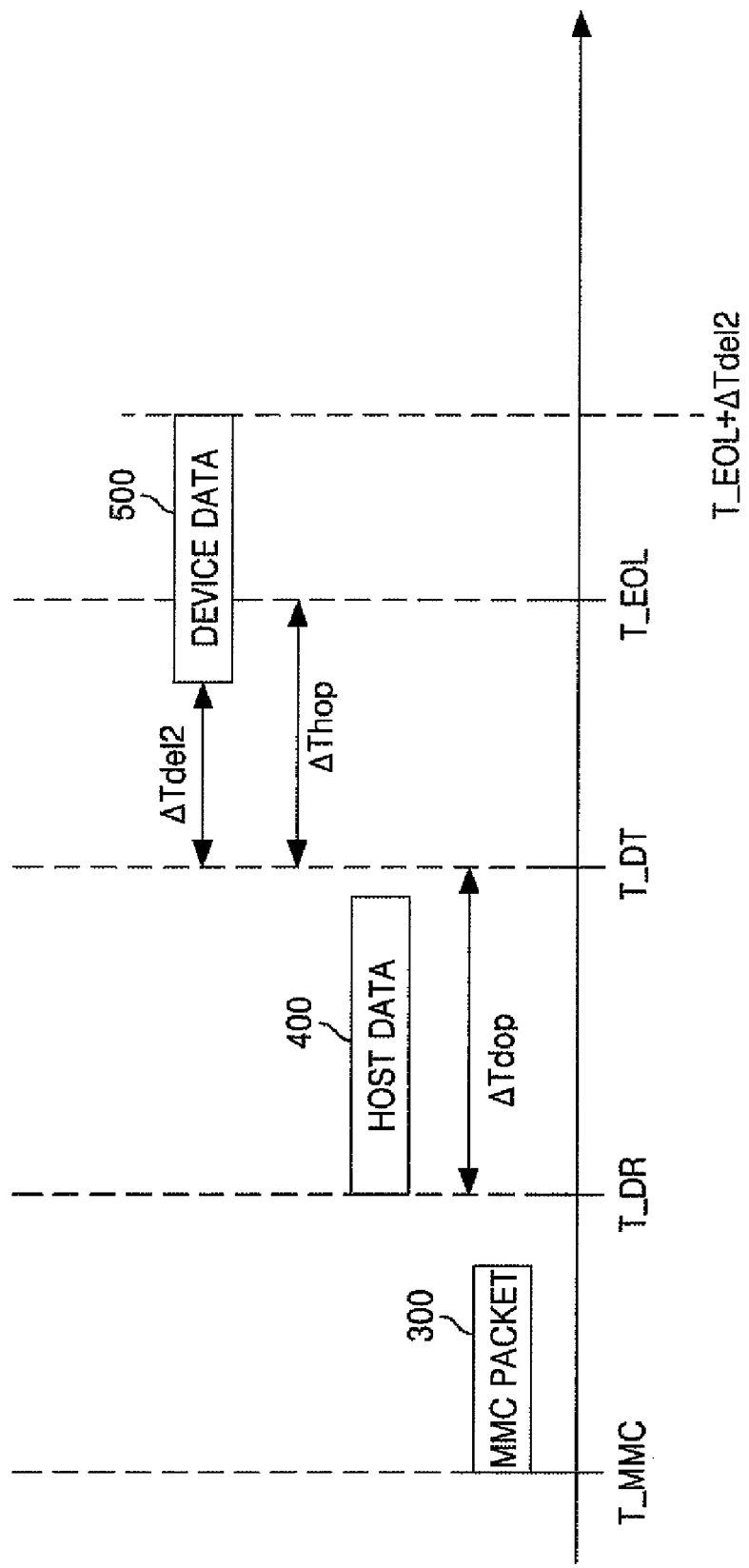

FIGS. 4 and 5 are directed to examples in which the device data 500 is not successfully transmitted to a WUSB host in the "packet receiving period". In particular, FIG. 4 shows a case where a time period in which a WUSB device transmits the device data 500 is totally outside of the "packet receiving period". FIG. 5 shows a case where a period in which a WUSB device transmits the device data 500 partially overlaps the "packet receiving period".

Referring to FIG. 4, a WUSB host transmits the MMC packet 300 at the time T_MMC and transmits the host data 400 to the WUSB device designated in the MMC packet 300 in the "packet transmitting period ΔTdop". Then, the WUSB host opens a receiver and waits for the device data 500 transmitted from the WUSB device in the "packet receiving period ΔThop". In the example of FIG. 4, however, the WUSB device starts the transmission of the device data 500 after a time delay ΔTdel1 subsequent to the reception of the host data 400, that is, at a time T_DT+ΔTdel1, where ΔTdel1>ΔThop. In other words, the WUSB device starts transmitting the device data 500 after the "packet receiving period ΔThop" has elapsed. Since the WUSB host opens the receiver only in the "packet receiving period ΔThop", none of the device data 500 is received by the WUSB host.

Referring now to the example of FIG. 5, the WUSB host transmits the MMC packet 300 at the time T_MMC and transmits the host data 400 to the WUSB device designated in the MMC packet 300 in the "packet transmitting period ΔTdop". Then, the WUSB host opens a receiver and waits for the device data 500 transmitted from the WUSB device in the "packet receiving period ΔThop". However, the WUSB device starts the transmission of the device data 500 after a time delay of ΔTdel2 subsequent to the reception of the host data 400, that is, at a time T_DT+ΔTdel2, where ΔTdel2<ΔThop. In this case, since the WUSB host opens the receiver only in the "packet receiving period ΔThop", it cannot successfully receive the entirety of the device data 500.

In account for these cases of unsuccessful transmission of the device data 500 such as shown in the examples of FIGS. 4 and 5, the WUSB host according to an exemplary embodiment of the inventive concepts adaptively changes the "packet receiving period ΔThop" according to the operating characteristics of the WUSB device, thereby efficiently managing a WUSB communication channel.

Figure 6:
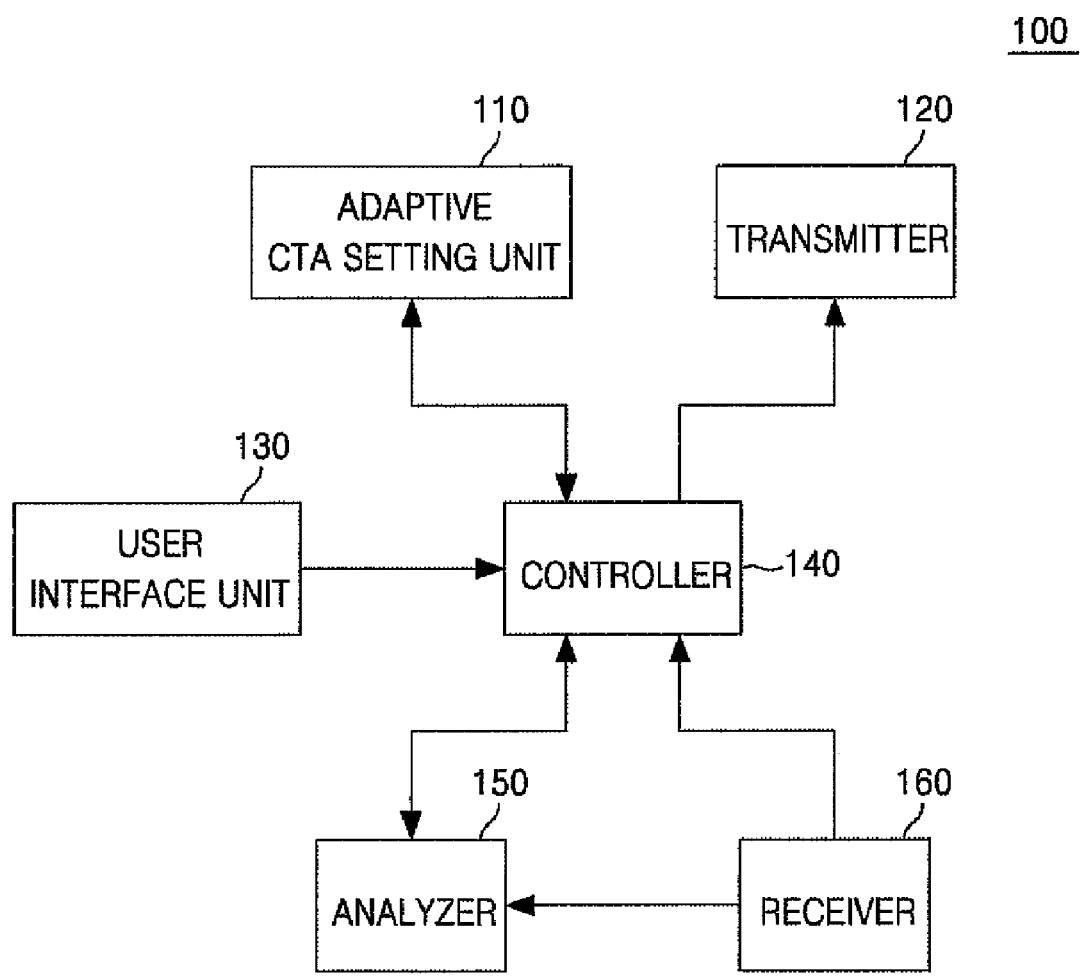
FIG. 6 is a schematic block diagram of a WUSB host according to an exemplary embodiment of the inventive concepts.

FIG. 6 is a schematic block diagram of the WUSB host 100 according to an exemplary embodiment of the inventive concepts. Referring to FIG. 6, the WUSB host 100 includes an adaptive CTA setting unit 110, a transmitter 120, a user interface unit 130, a controller 140, an analyzer 150, and a receiver 160.

The adaptive CTA setting unit 110 reallocates a channel time with consideration of the operating characteristics of a WUSB device. In detail, the adaptive CTA setting unit 110 allocates a channel time to a WUSB device based on a result of the analyzer 150 which analyzes a reception state of a data packet transmitted from the WUSB device. For this operation, the adaptive CTA setting unit 110 determines a "packet receiving period", in which a data packet is received normally, as an optimal packet receiving period for the WUSB device, and allocates a channel time to the WUSB device based on the optimal packet receiving period.

The adaptive CTA setting unit 110 may allocate the entire optimal packet receiving period to a WUSB device or may allocate a period from reception of a data packet from the WUSB device to completion of the reception in the optimal packet receiving period to the WUSB device. The former operation may be used when a real transmitting period of device data is completely outside of the "packet receiving period" as illustrated in FIG. 4, and the latter operation may be used when a real transmitting period of device data partially overlaps the "packet receiving period" as illustrated in FIG. 5.

When the analyzer 150 determines that a data packet has not been normally received, the adaptive CTA setting unit 110 extends a packet receiving period by a predetermined extension period ΔTu in order to determine an optimal packet receiving period for a WUSB device, and temporarily allocates channel times based on the extended packet receiving period to the WUSB device. In addition, the adaptive CTA setting unit 110 transmits CTA information including the allocated channel times to the controller 140 so that an MMC packet including the CTA information is generated.

Through those operations, the adaptive CTA setting unit 110 reduces errors in data packet transmission that occur due to the operating characteristics or environment of a WUSB device.

As mentioned above, a data packet may not be received normally because of the problem with the WUSB device, or it may not be received normally because of temporal changes in a communication state. If the adaptive CTA setting unit 110 changes the "packet receiving period" as described above for a transmission error due to the temporary change in the communication state, the "packet receiving period" needs to be changed again when the communication state is recovered. In order to reduce such operational overhead, the adaptive CTA setting unit 110 may count the number of times a data packet is not normally received from a WUSB device and change a "packet receiving period" for the WUSB device only when a count result is greater than a predetermined threshold value.

The transmitter 120 is a wireless transmitter and connects the WUSB host 100 to a channel and transmits an MMC packet to a plurality of WUSB devices performing WUSB communication. At this time, the transmitter 120 broadcasts an MMC packet including CTA information targeting at least one of the WUSB devices to the WUSB devices.

The user interface unit 130 provides an interface between the WUSB host 100 and a user. The user interface unit 130 may be a keyboard, a mouse, or a touch input device.

The controller 140 generates an MMC packet including CTA information set by the adaptive CTA setting unit 110 and transmits the MMC packet to the transmitter 120 so that the MMC packet is broadcast to the WUSB devices.

The analyzer 150 analyzes at least one data packet received by the receiver 160, determines whether the data packet has been received normally, and transmits an analysis result to the adaptive CTA setting unit 110 through the controller 140.

The receiver 160 is a wireless receiver and receives at least one data packet from at least one WUSB device in a packet receiving period indicated by CTA information, included in an MMC packet, targeting the at least one WUSB device and transmits the at least one data packet to the analyzer 150.

As one skilled in the art will appreciate, the adaptive CTA setting unit 110, the controller 140, and the analyzer 150 may be physically implemented by a microprocessor, electronic logic circuits and/or memory circuits programmed to execute the routines described below in connection with the FIGS. 7 and 10. Further, while the adaptive CTA setting unit 110, the controller 140, and the analyzer 150 are illustrated a separate functional blocks in FIG. 6, they may be physically combined, for example, into a single device or semiconductor chip.

Figure 7:
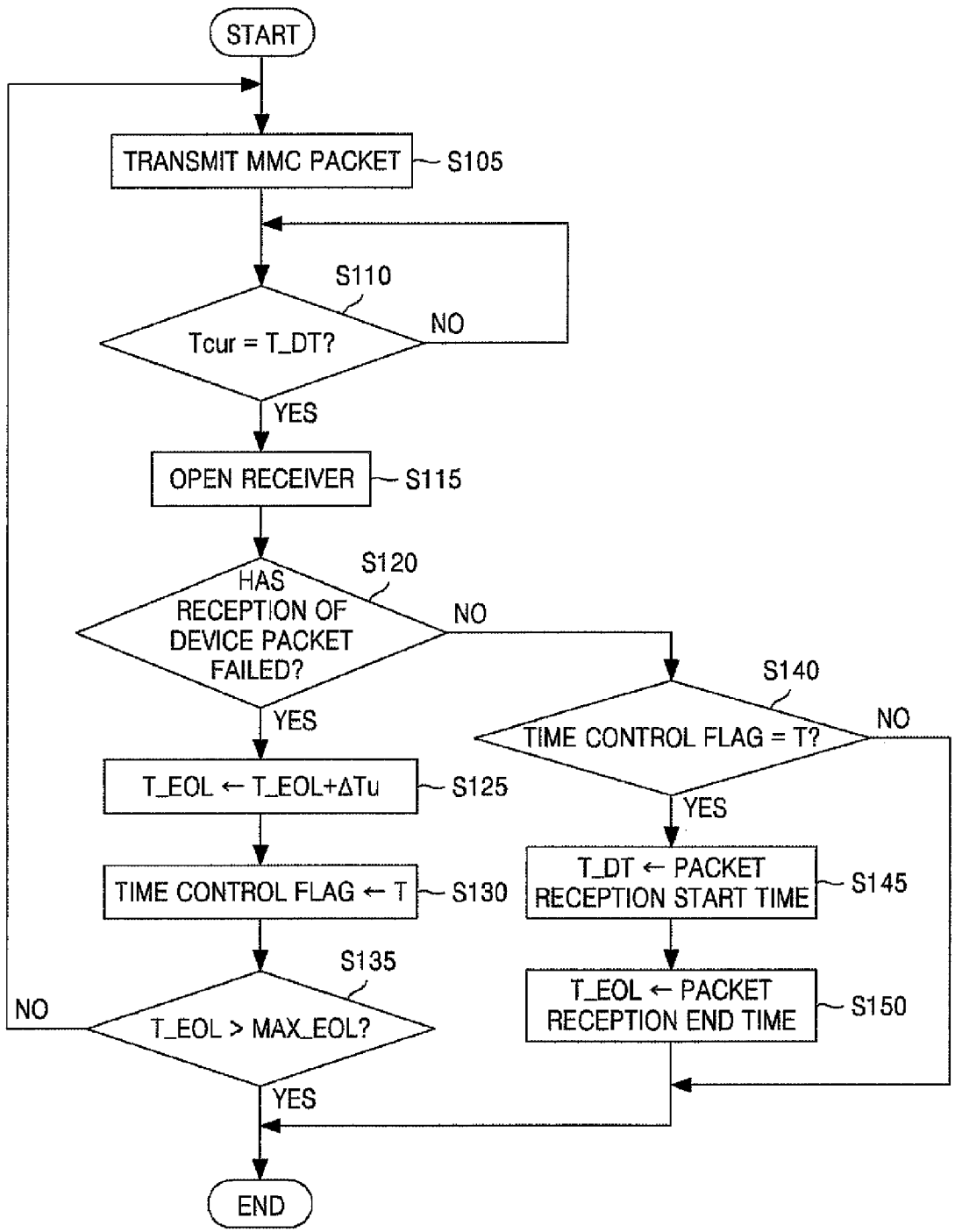
FIG. 7 is a flowchart of a CTA method performed by the WUSB host illustrated in FIG. 6 according to an exemplary embodiment of the inventive concepts.

FIG. 7 is a flowchart of a CTA method performed by the WUSB host 100 illustrated in FIG. 6 according to an exemplary embodiment of the inventive concepts. In particular, the CTA method illustrated in FIG. 7 is for the case where a WUSB device transmits an entire data packet after lapsing of a "packet receiving period" set in an MMC packet, as illustrated in FIG. 4.

Referring to FIGS. 6 and 7, the transmitter 120 transmits an MMC packet in operation S105. As described above with reference to FIG. 2, the MMC packet is transmitted at the predetermined MMC packet transmission time T_MMC and includes the header 310, the CTA information 320, and the next MMC packet transmission time T_NMMC 340. The CTA information 320 includes the time T_DR 321 at which the WUSB host 100 starts sending a data packet to a particular WUSB device, the time T_DT 323 at which the WUSB host 100 starts receiving a data packet from the particular WUSB device, and the time T_EOL 325 at which the reception of the data packet ends. At this time, as described above with reference to FIG. 3, a period from the time T_DT at which reception of the data packet starts to the time T_EOL at which the reception of the data packet ends is referred to as a "packet receiving period".

The MMC packet transmitted by the transmitter 120 in operation S105 includes an initial packet receiving period in the CTA information 320. The "initial packet receiving period" is a packet receiving period allocated in common to all WUSB devices connected to the WUSB host 100 without considering the operating characteristics of each WUSB device. The MMC packet may also include identification information of the particular WUSB device (hereinafter, referred to as a first WUSB device) to which the channel times, i.e., T_DR, T_DT, and T_EOL are allocated since the MMC packet is broadcast to all WUSB devices connected to the WUSB host 100.

When it is determined that a current time T_DT reaches the time T_DT included in the MMC packet in operation S110, the controller 140 opens the receiver 160 in operation S115 to receive a data packet from the first WUSB device.

When it is determined as a result of analysis by the analyzer 150 that reception of the data packet from the first WUSB device has failed in operation S120, the adaptive CTA setting unit 110 extends the initial packet receiving period by the predetermined extension period $\Delta Tu$. In other words, the adaptive CTA setting unit 110 delays the time T_EOL at which the reception of the packet data ends by the predetermined extension period $\Delta Tu$ (i.e., T_EOL ←T_EOL'$\Delta$Tu) in operation 5125. The adaptive CTA setting unit 110 also changes a predetermined time control flag into "T" in operation S130 so that a history of extension of the initial packet receiving period can be later referenced.

The controller 140 receiving the extended packet receiving period determines whether the extended packet receiving period is greater than a predetermined maximum packet receiving period in operation 5135. At this time, the controller 140 determines whether the delayed reception end time T_EOL is greater than a predetermined maximum value MAX_EOL.

When it is determined that the extended packet receiving period is not greater than the predetermined maximum packet receiving period, the controller 140 generates an MMC packet based on CTA including the extended packet receiving period and transmits the MMC packet to the first WUSB device through the transmitter 120. Thereafter, operations S105 through S135 for determining whether the data packet has been normally received from the first WUSB device are repeated until the data packet is normally received from the first WUSB device.

When it is determined as the result of analysis by the analyzer 150 that the reception of the data packet from the first WUSB device has been successful in operation S120, the adaptive CTA setting unit 110 resets the initial packet receiving period for the first WUSB device based on the extended packet receiving period in operations S140 through S150. Firstly, the adaptive CTA setting unit 110 checks the time control flag in operation S140 in order to detect whether the initial packet receiving period has been extended for the first WUSB device. When the data packet has been transmitted normally from the first WUSB device in the initial packet receiving period that has not been extended, it is not necessary to reset the initial packet receiving period for the first WUSB device.

When the time control flag is "T" in operation 5140, the adaptive CTA setting unit 110 resets a packet receiving period for the first WUSB device to a period from the start of reception of the data packet to the end of the reception of the data packet. In other words, the adaptive CTA setting unit 110 changes a value of the time T_DT to a real packet reception start time of device data in operation 5145, and changes a value of the time T_EOL to a real packet reception end time of the device data in operation S150.

Figure 8:
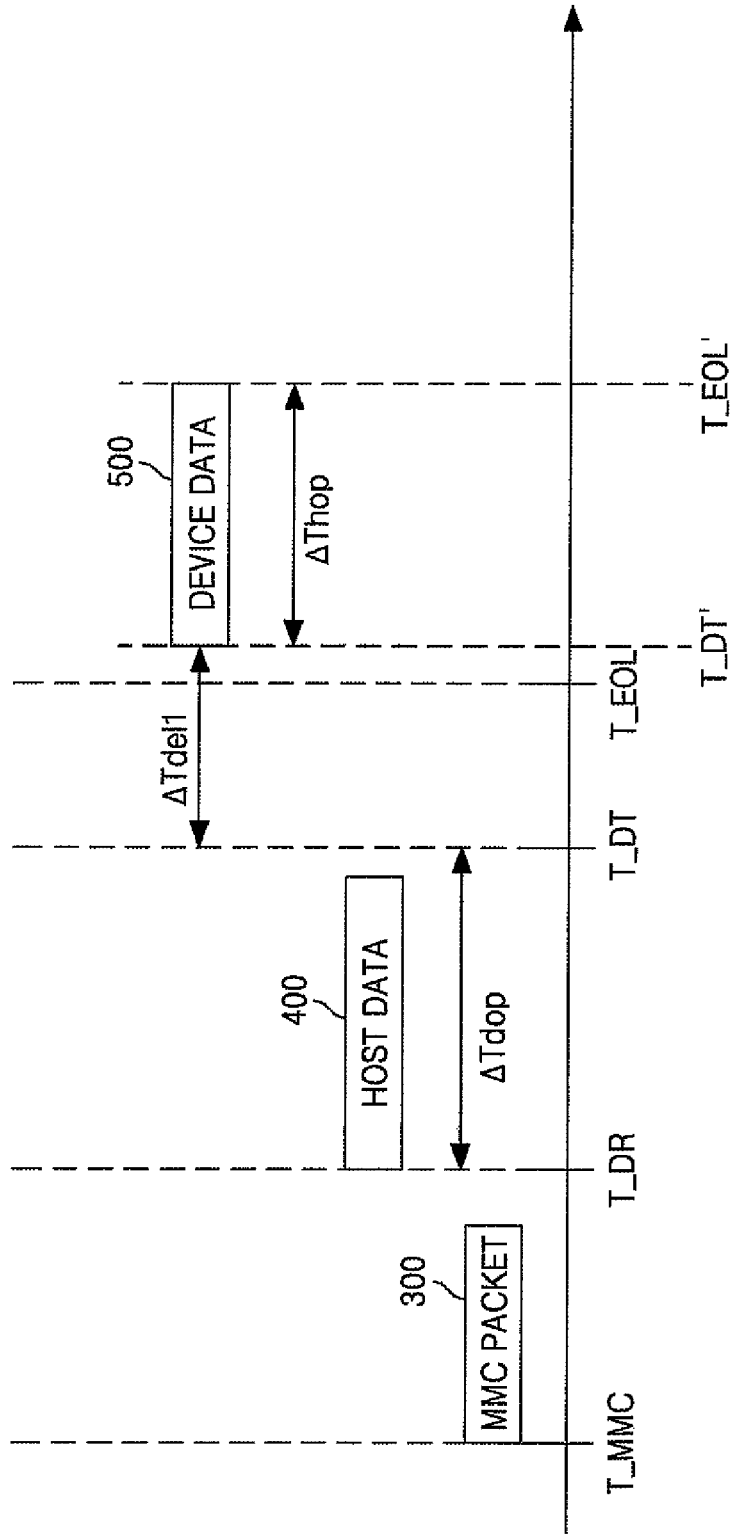
FIGS. 8 and 9 are timing charts for describing an example of communication of a data packet between the WUSB host and a WUSB device using the method illustrated in FIG. 7.
Figure 9:
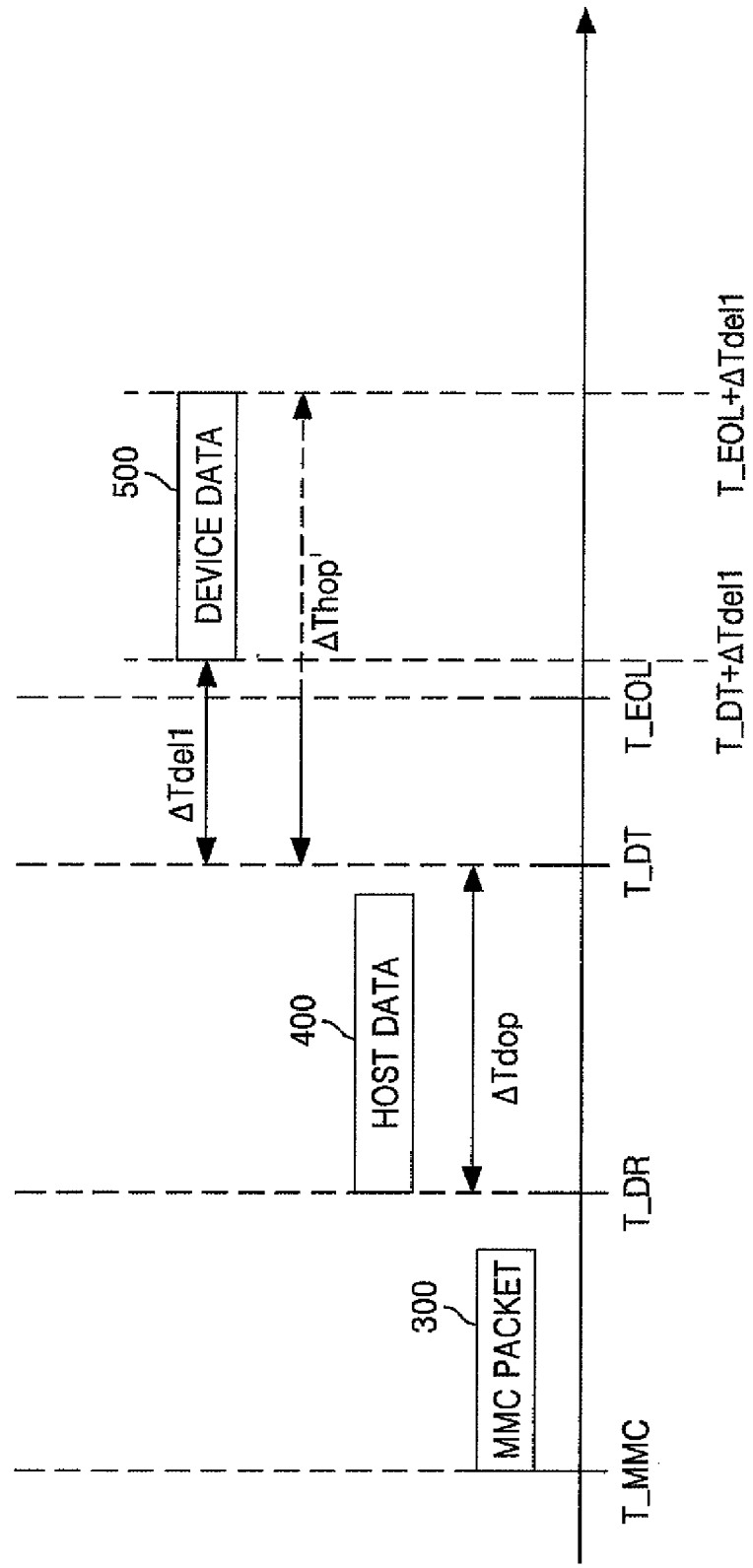

FIGS. 8 and 9 are timing charts showing an example of data packet communication between a WUSB host and a WUSB device using the method illustrated in FIG. 7. The timing in which the WUSB host transmits the MMC packet 300 at the time T_MMC and transmits the host data 400 to the first WUSB device in the "packet transmitting period $\Delta Tdop$" starting from the packet transmission time T_DR in FIGS. 8 and 9 has been described with reference to FIGS. 3 through 5. Thus, a detailed description thereof will be omitted here to avoid redundancy. The operations after the time T_DT will be described with reference to FIGS. 8 and 9 below.

Referring to FIG. 8, to receive the device data 500 transmitted at the time T_DT+$\Delta$Tdel1 delayed from the predetermined data packet reception start time T_DT, the WUSB host gradually extends the data packet reception end time T_EOL to a time T_EOL+$\Delta$Tdel1 at which normal reception of the device data 500 is completed.

Referring to FIG. 9, the WUSB host changes the initial packet receiving period for the first WUSB device based on an extended packet receiving period $\Delta$Thop' illustrated in FIG. 8. In detail, the WUSB host resets the initial packet receiving period for the first WUSB device to a period from a time (T_DT'←T_DT+$\Delta$Tdel1) at which the device data 500 starts to be received to a time (T_EOL'←T_EOL+$\Delta$Tdel1) at which the reception of the device data 500 is complete.

Figure 10:
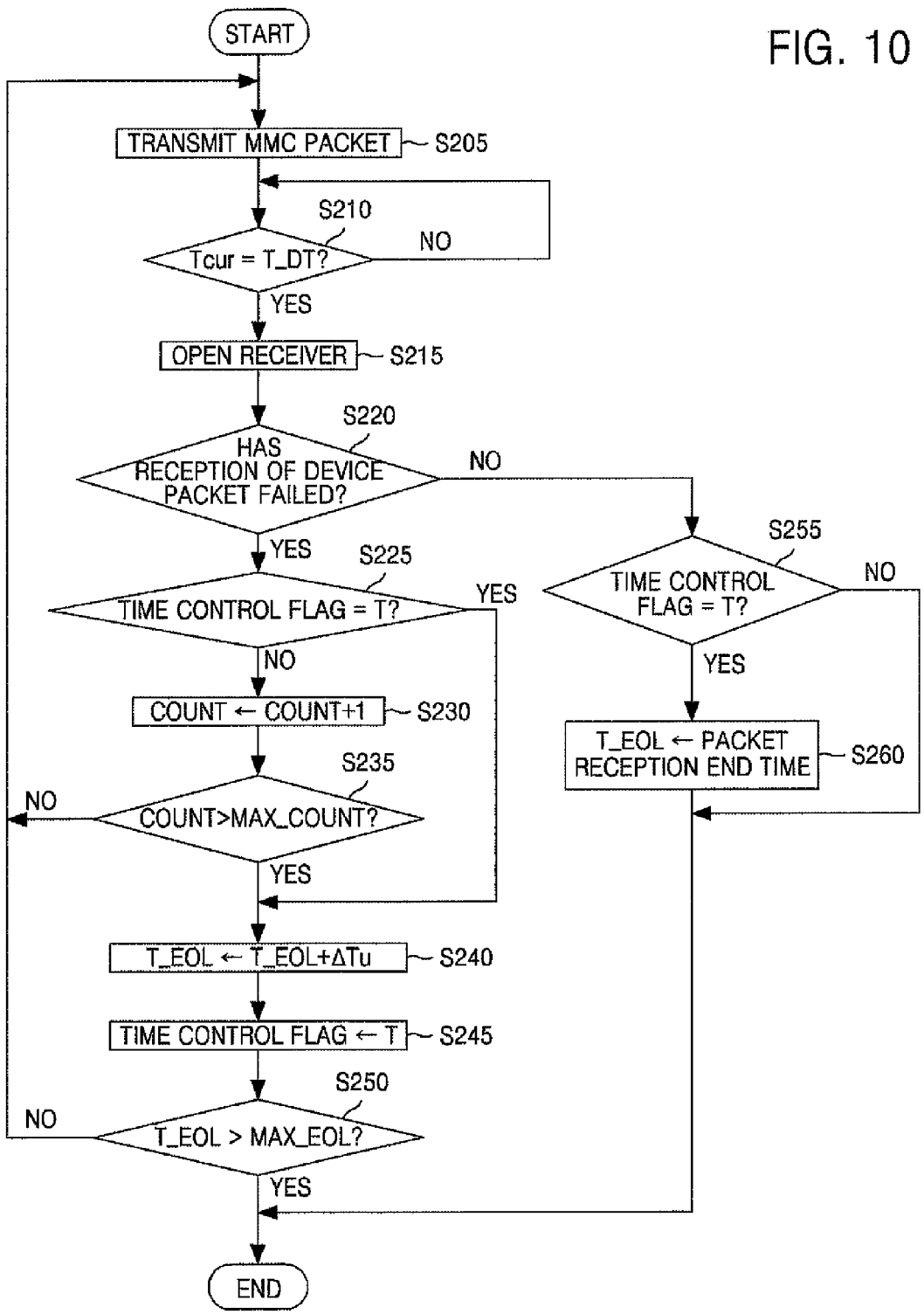
FIG. 10 is a flowchart of a CTA method performed by the WUSB host illustrated in FIG. 6 according to another exemplary embodiment of the inventive concepts.

FIG. 10 is a flowchart of a CTA method performed by the WUSB host 100 illustrated in FIG. 6 according to other embodiments of the inventive concepts. Referring to FIGS. 6 and 10, the transmitter 120 transmits an MMC packet in operation S205. The MMC packet has been described with reference to FIGS. 6 and 7. Thus, the detailed description thereof will be omitted here to avoid redundancy.

When it is determined that a current time T_DT reaches the time T_DT included in the MMC packet in operation S210, the controller 140 opens the receiver 160 in operation S215 to receive a data packet from the first WUSB device.

When it is determined as a result of analysis by the analyzer 150 that reception of the data packet from the first WUSB device has failed in operation S220, it is determined whether a failure count exceeds a predetermined threshold value MAX_COUNT. For this operation, the adaptive CTA setting unit 110 determines whether a loop (hereinafter, referred to as a "failure counting loop") for counting the number of failures has been performed. That the failure counting loop has been performed means that the failure count exceeds the predetermined threshold value. In the method illustrated in FIG. 10, the adaptive CTA setting unit 110 checks a time control flag in operation 5225 in order to check history of the failure counting loop because the adaptive CTA setting unit 110 sets the time control flag to "T" after the failure counting loop breaks.

When the time control flag is not "T", the adaptive CTA setting unit 110 counts the failure and outputs the failure count (COUNT←COUNT+1) in operation 5230. Only when it is determined that the failure count exceeds the predetermined threshold value MAX_COUNT in operation S235, the adaptive CTA setting unit 110 extends the packet receiving period in operation S240. To extend the packet receiving period, as has been described with reference to FIGS. 6 and 7, the adaptive CTA setting unit 110 delays the data packet reception end time T_EOL by the predetermined extension period ΔTu (i.e., T_EOL←T_EOL'ΔTu). The adaptive CTA setting unit 110 also sets the time control flag into "T" in operation 5245. The reason why the time control flag is set to "T" here has been described previously with reference to FIGS. 6 and 7.

The controller 140 receiving the extended packet receiving period determines whether the extended packet receiving period is greater than a predetermined maximum packet receiving period in operation 5250. At this time, the controller 140 determines whether the delayed data packet reception end time T_EOL is greater than a predetermined maximum value MAX_EOL.

When it is determined that the extended packet receiving period is not greater than the predetermined maximum packet receiving period, the controller 140 generates an MMC packet based on the CTA including the extended packet receiving period and transmits the MMC packet to the first WUSB device through the transmitter 120. Thereafter, operations 5205 through 5250 for determining whether the data packet has been normally received from the first WUSB device are repeated until the data packet is normally received from the first WUSB device.

When it is determined as the result of analysis by the analyzer 150 that the reception of the data packet from the first WUSB device has been successful in operation S220, the adaptive. CTA setting unit 110 resets the initial packet receiving period for the first WUSB device based on the extended packet receiving period. For this operation, the adaptive CTA setting unit 110 checks the time control flag in operation 5255 in order to detect whether the initial packet receiving period has been extended for the first WUSB device. When the data packet has been transmitted normally from the first WUSB device in the initial packet receiving period that has not been extended, it is not necessary to reset the initial packet receiving period for the first WUSB device.

When the time control flag is "T" in operation 5255, the adaptive CTA setting unit 110 resets a packet receiving period for the first WUSB device to a period from the start point of the initial packet receiving period to the end of the reception of the data packet. In other words, the adaptive CTA setting unit 110 maintains an initial value of the time T_DT, and changes a value of the time T_EOL to a real packet reception end time of the device data in operation 5260.

Figure 11:
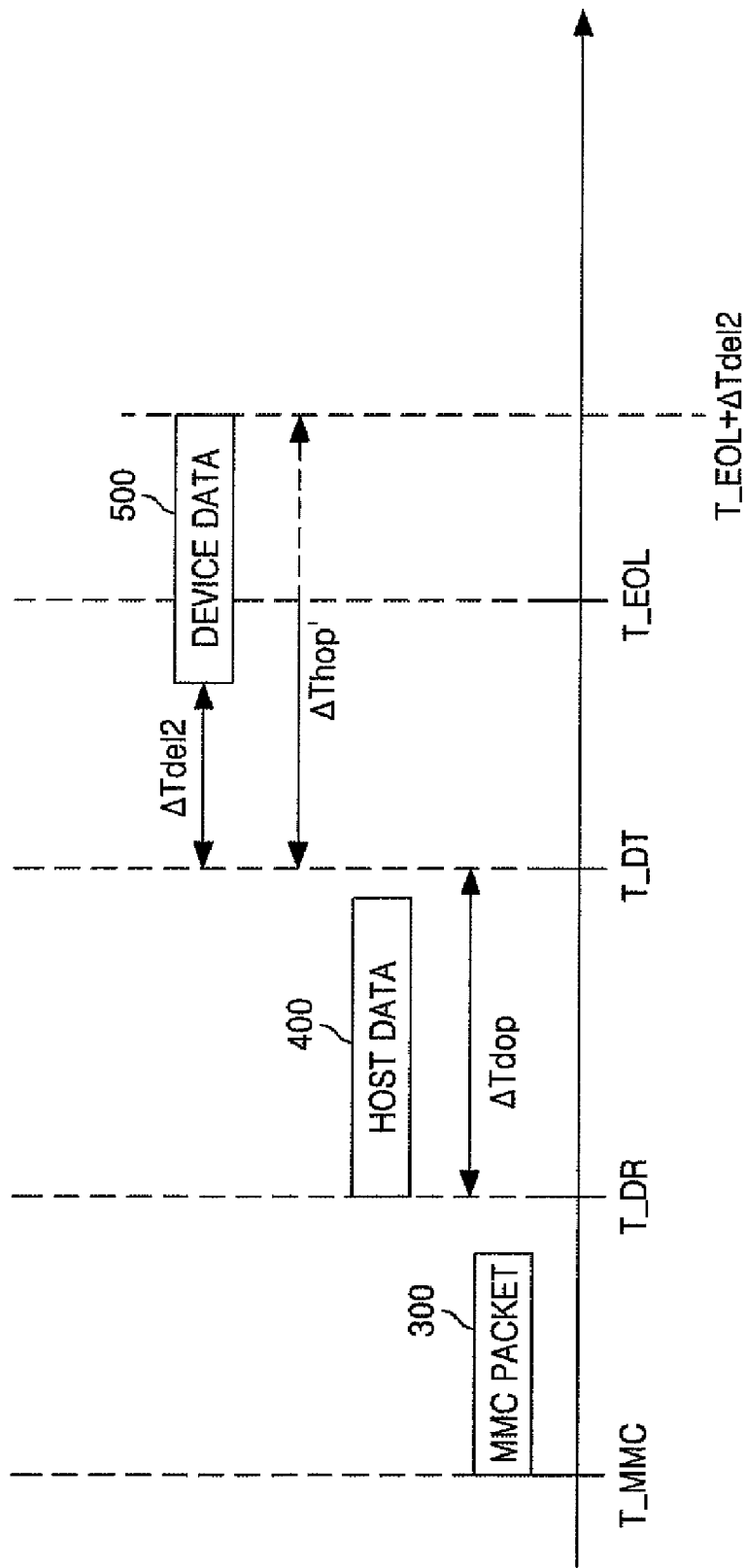

FIGS. 11 and 12 are timing charts showing data packet communication between a WUSB host and a WUSB device using the method illustrated in FIG. 10. The timing in which the WUSB host transmits the MMC packet 300 at the time T_MMC and transmits the host data 400 to the first WUSB device in the "packet transmitting period ΔTdop" starting from the packet transmission time T_DR in FIGS. 11 and 12 has been described with reference to FIGS. 3 through 5. Thus, a detailed description thereof will be omitted here to avoid redundancy. The operations after the time T_DT will be described with reference to FIGS. 11 and 12 below.

Referring to FIG. 11, to receive the device data 500 transmitted at the time T_DT+ΔTdel2 delayed from the predetermined data packet reception start time T_DT, the WUSB host gradually extends the data packet reception end time T_EOL to a time T_EOL+ΔTdel2 at which normal reception of the device data 500 is complete.

Referring to FIG. 12, the WUSB host changes the initial packet receiving period for the first WUSB device based on an extended packet receiving period ΔThop' illustrated in FIG. 8. In particular, the WUSB host resets the initial packet receiving period for the first WUSB device to a period from the time T_DT to a time (T_EOL'←T_EOL+ΔTdel2) at which the reception of the device data 500 is complete.

After the initial packet receiving period is reset as described above, when the WUSB host transmits an MMC packet to the first WUSB device, the WUSB host generates CTA information for the first WUSB device based on the reset initial packet receiving period. In other words, the WUSB host does not allocate fixed channel times to all WUSB devices, but instead allocates different channel times to each WUSB device with consideration of the operating characteristics of the WUSB device. Accordingly, inefficiency occurring by using fixed channel times in managing a WUSB communication channel can be improved.

While the inventive concepts has been particularly shown and described with reference to exemplary embodiments thereof, it will be understood by those of ordinary skill in the art that various changes in forms and details may be made therein. For instance, in the above-described embodiments, a first WUSB device that is designated by a WUSB host for data packet transmission is the same as a second WUSB device that is designated by the WUSB host for data packet reception in an MMC packet. However, the first WUSB device may not be the same as the second WUSB device. In addition, an MMC packet includes a single packet transmitting period and a single packet receiving period in the above-described embodiments, but the MMC packet may include more than one packet transmitting period and more than one packet receiving period. Accordingly, the spirit and scope of the inventive concepts will be defined by the following claims.

What is claimed is:

1. A wireless universal serial bus (WUSB) host which is configured to execute WUSB communication with at least one WUSB device, the WUSB host comprising:
    a transmitter configured to broadcast an initial control packet to the at least one WUSB device, wherein the control packet includes channel time allocation (CTA) information generated for the at least one WUSB device;
    a receiver configured to receive a data packet from the at least one WUSB device in a packet receiving period indicated by the CTA information included in the control packet;
    an analyzer configured to analyze at least one data packet received by the receiver and to determine whether the data packet has been normally received;
    an adaptive CTA setting unit configured to adaptively determine, for each of the at least one WUSB device, an optimal packet receiving period in which the analyzer has determined that the data packet has been normally received, and to set the CTA information generated for the at least one WUSB device based on the optimal packet receiving period; and
    a controller configured to generate a subsequent control packet including the CTA information set by the adaptive CTA setting unit.

2. The WUSB host of claim 1, wherein the adaptive CTA setting unit sets the CTA information such that the entire optimal packet receiving period is indicated as the packet receiving period for the at least one WUSB device.

3. The WUSB host of claim 1, wherein the adaptive CTA setting unit sets the CTA information such that a period from a time at which a data packet starts to be received from the at least one WUSB device to a time at which reception of the data packet is completed is indicated as the packet receiving period for the at least one WUSB device.

4. The WUSB host of claim 1, wherein the adaptive CTA setting unit extends a packet receiving period indicated by the CTA information in which a data packet has not been normally received by a predetermined extension period, allocates channel times including an extended packet receiving period to the at least one WUSB device as temporary channel times, and transmits CTA information including the temporary channel times to the controller.

5. The WUSB host of claim 4, wherein the adaptive CTA setting unit counts the number of times a data packet has not been normally received normally from the at least one WUSB device and extends the packet receiving period for the at least one WUSB device when a count result exceeds a threshold value.

6. A channel time allocation (CTA) method of a wireless universal serial bus (WUSB) host, the CTA method comprising:
- a first transmitting operation of broadcasting CTA information including an initial packet receiving period together with an identification of a WUSB device;
- a first receiver opening operation of opening a receiver during the initial packet receiving period to receive a data packet from the WUSB device;
- an operation of extending the initial packet receiving period by a predetermined extension period when a data packet has not been normally received from the WUSB device in the initial packet receiving period;
- a second transmitting operation of broadcasting CTA information including an extended packet receiving period together with the identification of the WUSB device;
- a second receiver opening operation of opening the receiver in the extended packet receiving period to receive a data packet from the WUSB device; and
- an operation of resetting the initial packet receiving period for the WUSB device based on the extended packet receiving period when a data packet has been normally received from the first WUSB device in the extended packet receiving period.

7. The CTA method of claim 6, further comprising reextending the extended packet receiving period by the predetermined extension period and then repeating the second transmitting operation and the second receiver opening operation when a data packet has not been normally received from the WUSB device in the extended packet receiving period.

8. The CTA method of claim 6, further comprising counting the number of times a data packet is not received normally from the WUSB device after the first opening operation,
wherein the operation of extending is performed only when a count result exceeds a predetermined threshold value.

9. The CTA method of claim 6, wherein the operation of resetting comprises setting the entire extended packet receiving period as the initial packet receiving period for the WUSB device.

10. The CTA method of claim 6, wherein the operation of resetting comprises setting a period from a time at which the data packet starts to be received from the first WUSB device to a time at which reception of the data packet is complete as the initial packet receiving period for the WUSB device.

* * * * *